US005579081A

United States Patent [19]
Ishiguro

[11] Patent Number: 5,579,081
[45] Date of Patent: Nov. 26, 1996

[54] CAMERA WITH BUILT-IN ELECTRONIC FLASH

[75] Inventor: Minoru Ishiguro, Saitama-ken, Japan

[73] Assignee: Fuji Photo Optical Co., Ltd., Saitama-ken, Japan

[21] Appl. No.: 562,628

[22] Filed: Nov. 24, 1995

[51] Int. Cl.$^6$ ................................................ G03B 15/05
[52] U.S. Cl. .......................... 396/161; 396/166; 396/176; 396/195
[58] Field of Search ................................... 354/414, 416, 354/417, 421, 422, 137, 149.11

[56] References Cited

FOREIGN PATENT DOCUMENTS 57-54777  11/1982  Japan.

*Primary Examiner*—W. B. Perkey
*Attorney, Agent, or Firm*—Young & Thompson

[57] ABSTRACT

An ever-flash exposure control system for a built-in flash camera regulates a triggering time T1 from the commencement of gradual opening of a program shutter at which an electronic flash is triggered and a flash duration time T2 for which the electronic flash continuously provides illumination light so as to provide proper exposure according to scene brightness.

6 Claims, 8 Drawing Sheets

FIG. 6

| SCENE BRIGHTNESS | | OFS = 1/8 (-3EV) | OFS = 1/4 (-2EV) | OFS = 1/2 (-1EV) | OFS = 0 (OFF) |
|---|---|---|---|---|---|
| B3(Bv=8) | | | | | |
| | | OFS = 1/4 (-2EV) | OFS = 1/4 (-2EV) | OFS = 1/2 (-1EV) | OFS = 0 (OFF) |
| B2(Bv=6) | | | | | |
| | | OFS = 1/2 (-1EV) | OFS = 1/2 (-1EV) | OFS = 1 (0EV) | OFS = 1 (0EV) |
| B1(Bv=3.5) | | | | | |
| | | OFS = 1 (0EV) | OFS = 1 (0EV) | OFS = 1 (0EV) | OFS = 1 (0EV) |
| | NEAR | D1 (1.3 m) | D2 (3 m) | D3 (8.9 m) | |

SUBJECT DISTANCE

CAMERA WITH BUILT-IN ELECTRONIC FLASH

BACKGROUND OF THE INVENTION

1. Field of the Invention

The present invention relates to a camera with a built-in electronic flash or strobe which makes flashmatic exposure control even during the daytime so as to provide proper exposure.

2. Description of Related Art

Some types of flashmatic automatic exposure control cameras with program shutters have a feature of flash exposure even in the daytime which is called an ever-flash exposure. One such ever-flash exposure control camera is that described in Japanese Patent Publication No. 57-54777. The approach used is to trigger the electronic flash at a proper timing during opening the shutter so as to provide proper exposure. For the purpose of providing a brief description about the prior art ever-flash exposure that will enhance an understanding of the present invention, reference is made to FIG. 8.

As shown in FIG. 8 showing a time chart of the ever-flash exposure control, a shutter commences to open at a time $t_0$ and increases linearly the aperture in size or area until a time $t_1$. After the shutter remains the maximum aperture $S_{max}$ from the time $t_1$ to a time $t_2$, it commences to close quickly and completes the exposure at a time $t_3$. During gradually increasing the aperture in size of the shutter, the electronic flash is triggered at a proper timing to provide illumination light toward the scene to be photographed. Shifting the flash triggering timing varies an effective quantity of flash illumination light contributory to film exposure (which is hereafter referred to as a contribution ratio of flash illumination light). For instance, the contribution ratio of flash illumination light is the largest when the electronic flash is triggered at times between the times $t_1$ and $t_2$. However, the contribution ratio of flash illumination light is reduced according to opened areas of the shutter when the electronic flash is triggered at times before the time $t_1$.

In the prior art ever-flash exposure control, the flash triggering timing is advanced closely to the time $t_0$ as the distance of a subject from the camera (which are referred to as a subject distance) becomes short. Due to unstable dynamic operations of the shutter in a short period of time immediately after the commencement of opening, for instance between the time $t_0$ and a time $t_0+\Delta t$, the shutter causes unstable dynamic operation. This leads to errors in ever-flash exposure control for subjects at relatively short subject distances in exposure times between the time $t_0$ and the time $t_0+\Delta t$. Together, if restricting the flash flush triggering timing after the critical smallest period of time $\Delta t$, there occurs over exposure for close up shots where a subject at a subject distance shorter than a specific subject distance which gives a critical aperture of the shutter, decisive to stable dynamic shutter operation, at the time $t_0+\Delta t$.

SUMMARY OF THE INVENTION

It is an object of the present invention to provide a camera with a built-in electronic flash which performs ever-flash exposure control properly effective even to close up shots.

The foregoing object of the present invention is achieved by an ever-flash exposure control system for a built-in flash camera provided with a program shutter which controls a flash triggering timing so as to reduce the contribution ratio of flash illumination light to exposure for subject at close subject distances. The ever-flash exposure control system controls a flash triggering time T1 and regulates a flash duration time T2 so as to make proper exposures according to scene brightness. The term "flash triggering time T1" shall mean and refer to a time at which the built-in electronic flash is triggered, or otherwise a period of time until the triggering of the built-in electronic flash from the commencement of gradually opening of the program shutter, and the term "flash duration time T2" shall mean and refer to a period of time for which the built-in electronic flash continuously provides illumination light. The program shutter may be of any type of lens shutter which makes exposure with combinations of shutter opening and shutter speed predetermined for various exposure values.

According to an embodiment of the present invention, the ever-flash exposure control system includes an operation means for calculating a flash triggering time T1 and a flash duration time T2 for proper exposure. Specifically, the operation means comprises a first operation means for calculating an aperture of the program shutter according to a given subject distance necessary to make proper exposure with a possible longest flash duration time T2 of flash illumination light and, on the basis of the shutter aperture, determines a flash triggering time T1 at which the program shutter develops the determined aperture and a second operation means for calculating a flash duration time T2 according to the subject distance for proper exposure when the electronic flash is triggered at the critical flash triggering time if the flash triggering time T1 is shorter than a critical flash triggering time at which the critical shutter aperture is achieved. The ever-flash exposure control system triggers the electronic flash at the flash triggering time T1 and causes it to provide illumination light continuously for the flash duration time T2.

According to another embodiment of the present invention, the ever-flash exposure control system comprises first and second operation means. The first operation means calculates an aperture of the program shutter according to a subject distance necessary to make proper exposure with a possible longest flash duration time T2 of flash illumination light and also calculates a time from the commencement of the program shutter necessary to develop the aperture as a flash triggering time T1. On the other hand, when the flash triggering time T1 is less than the predetermined shortest time, the second operation means reduces the flash duration time T2 by a predetermined time from the longest flash duration time and further calculates an aperture of the program shutter according to the subject distance necessary to make proper exposure with the reduced flash duration time T2 of flash illumination light. The calculation of the flash triggering time T1, which is necessary to develop the aperture suitable for proper exposure with the reduced flash duration time T2, is repeatedly increased by a predetermined time until the flash triggering time T1 becomes longer than the critical shortest time. The electronic flash is triggered at the time T2 so as to provide flash illumination light of the flash duration time T2.

In the above embodiments, the critical shortest time may be a time from the commencement of opening of the program shutter necessary to become stable in dynamic shutter operation.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIG. 6 is an illustration showing a correction value table;

DETAILED DESCRIPTION OF THE PREFERRED EMBODIMENTS

A camera with a built-in electronic flash, which is hereafter referred simply to as a built-in flash camera, according to a preferred embodiment of the present invention may be of any type of still picture cameras. Because such a camera is well known, the following description will be directed in particular to elements forming part of, or cooperating directly with, apparatus embodying the present invention. It is to be understood that camera elements not specifically shown or described may take various forms well known to those skilled in the art.

Figure 1:
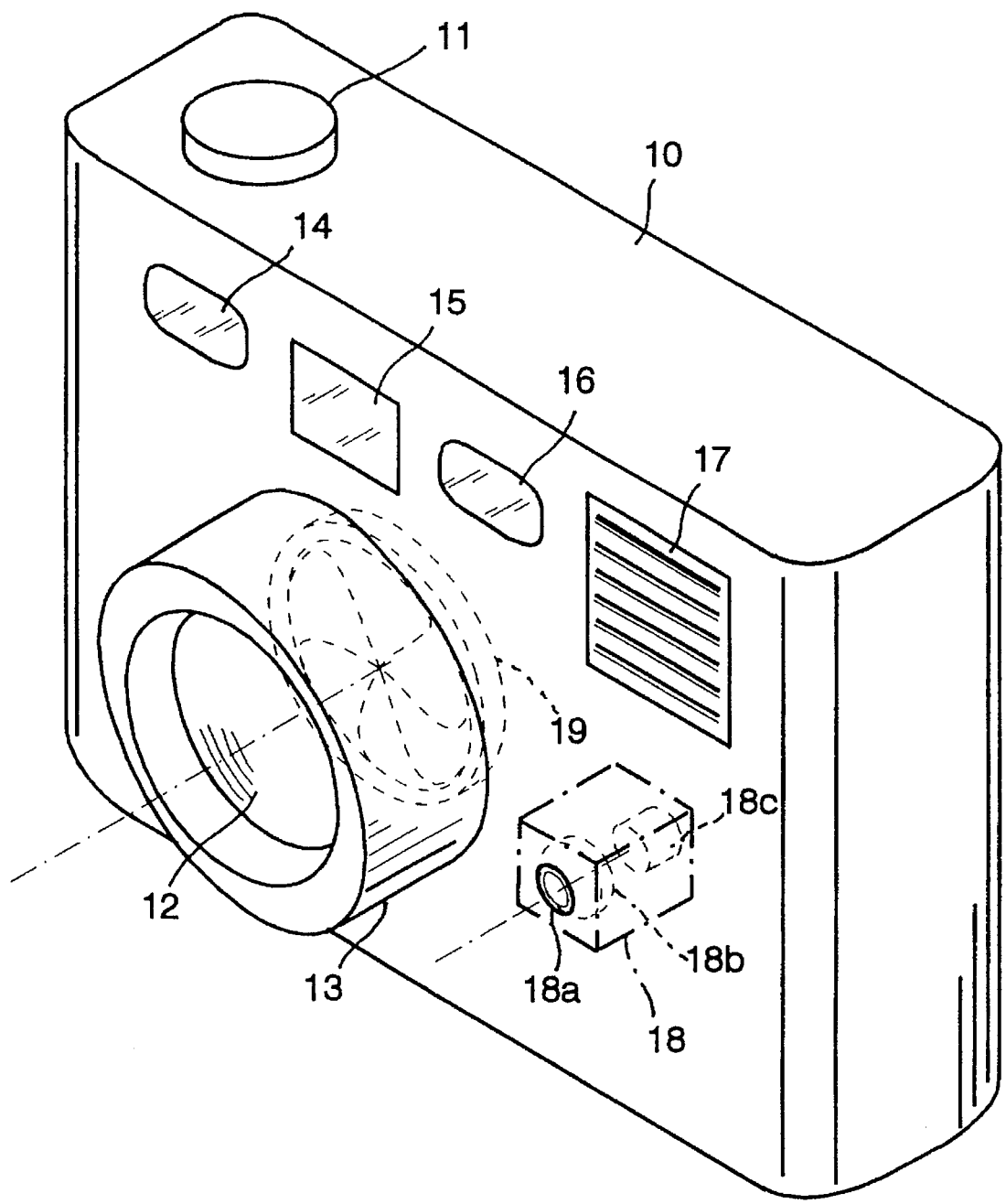
FIG. 1 is a perspective view of a camera with a built-in flash in accordance with a preferred embodiment of the present invention.

Referring now to the drawings in detail, and in particular, to FIG. 1, a built-in flash camera has a rectangularly-shaped body or housing 10. The camera housing 10 is provided with a manually operated shutter release button 11 disposed in the top wall thereof and a lens barrel 13, incorporating a taking lens system 12 therein, which is attached to the front wall of the camera housing 10. This shutter release button 11 is of the type which is depressed half its stroke for bringing the built-in flash camera ready for exposure and subsequently fully in the stroke for making exposure. Together, the shutter release button 11 provides control signals at these half and full strokes of depression, respectively. The camera housing 10 has various light windows 14, 15 and 16, arranged in a substantially horizontal straight row above the taking lens barrel 13 in the front wall and an electronic flash 17 which is schematically shown by a transparent diffusion plate. An active triangulation type of automatic range finding and focusing system is incorporated within the camera housing 10 so as to direct a detective light beam toward an subject in the scene through the window 14 and receives a light beam reflected by the subject through the window 16 so as to find a distance from the camera to the subject (which hereafter referred to as a subject distance for simplicity). The window 15 forms a part of a view finder (not shown). The active automatic range finding system is well known in various types and may takes any known type. Otherwise, any passive type of automatic range finding systems well known to those skilled in the art may be used.

The built-in flash camera further has a photometric device 18, disposed within the camera housing 10, for detecting the brightness of a subject in the scene. This photometric device 18 comprises a light window 18a disposed beside and in the close vicinity of the lens barrel 13, a lens 18b disposed behind the light window 18a and a photo-electric element 18c disposed behind the lens 18b. The photo-electric element 18c has a light receiving surface offset in a direction of the axis of the lens 18b backward or forward from an image plane on which the lens 18b forms an image so as to detect an average intensity of light from an overall scene covered by the taking lens system 12 rather than the intensity of direct light from the subject, i.e. the brightness of the subject.

An exposure control system, which will be described in detail later, automatically controls both the size or area of aperture of a program shutter 19 provided between the taking lens system 12 and a film plane within the camera housing 10 and a timing at which the electronic flash 17 is triggered so as to expose the film properly according to the intensity of ambient scene light or scene brightness. In this instance, the program shutter 19 is of the type opening to a maximum size of aperture with the passage of time and closing after having held the maximum size of or full aperture for a predetermined period of time. Together, the electronic flash 17 provides a predetermined peak duration of illumination light.

Figure 2:
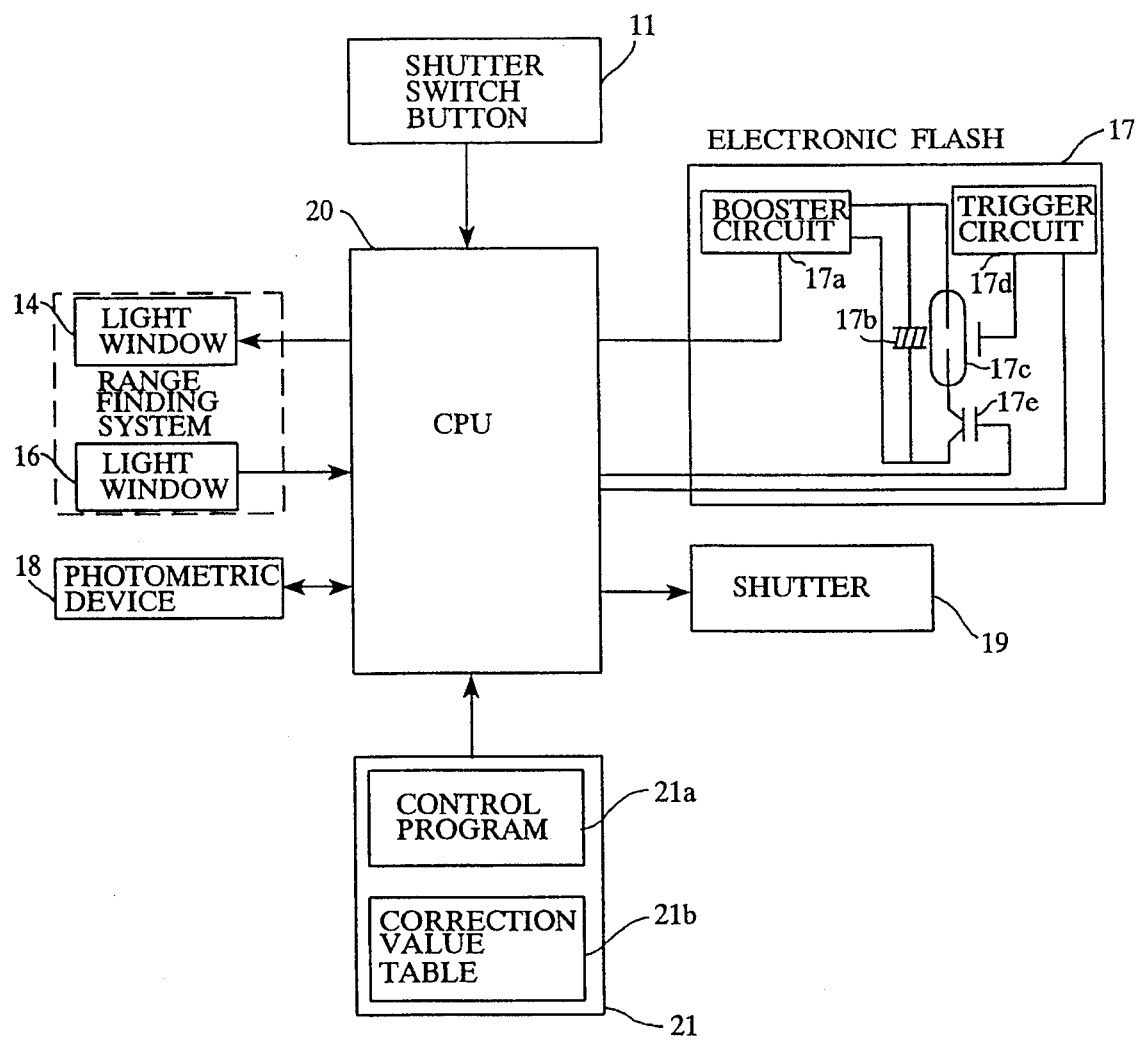
FIG. 2 is a block diagram showing an electronic flash triggering system.

Referring to FIG. 2, which shows an ever-flash exposure control system incorporated within the built-in flash camera of the present invention for optimizing the flash triggering time and the flash duration time according to a subject distance and a scene brightness so as to provide proper exposure, a center processing unit (CPU) 20, mainly comprising a microcomputer, performs the ever-flash exposure control according to a control program 21a loaded in a read only memory (ROM) 21. A flash duration control parameter or value table 21b, which will be described later, is also stored in the read only memory (ROM) 21. The control commences upon an occurrence of a signal generated when the shutter release button 11 is depressed half the stroke and brings the control system ready for operation. When receiving the half depression signal, the CPU 20 causes both automatic range finding system and photometric device 18 to operate so as to find a subject distance and a scene brightness, respectively. Signals representative of these subject distance and scene brightness are put into the CPU 20. When subsequently receiving a full depression signal generated when the shutter release button 11 is depressed fully in the stroke, the CPU 20 causes the program shutter 19 to open gradually and triggers the electronic flash 17 so as to provide illumination light at a time after the commencement of shutter opening, which is determined based on the subject distance and the scene brightness.

The electronic flash 17 comprises a booster circuit 17a, a capacitor 17b, a flash bulb 17c, a trigger circuit 17d and a switching element, such as an insulated gate bi-polar transistor (IGBT) switch 17e. As will be described later, the IGBT switch 17e is turned conductive at a time after commencement of opening of the program shutter 19 according to a given aperture value Av.

Figure 3:
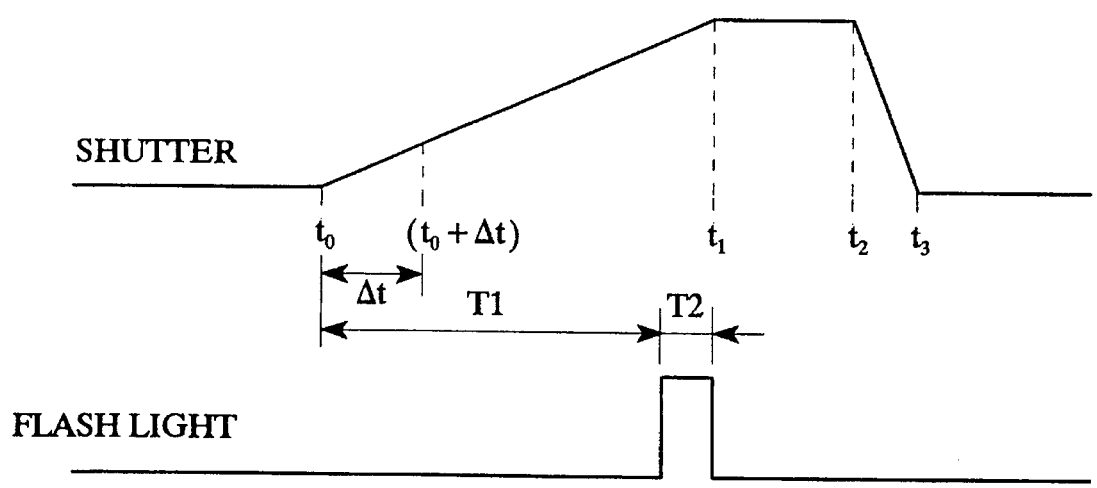
FIG. 3 is a time chart showing a relationship between shutter aperture and electronic flash triggering.

The built-in flash camera of this invention regulates an exposure by automatically and finely shifting a timing of triggering the electronic flash 17 relative to the commencement of opening of the program shutter 19. The program shutter 19 automatically determines an aperture and a speed in combination according to an exposure value Ev so as to make proper exposure. As shown in FIG. 3, the program shutter 19 commences its operation before a time $t_0$ at which shutter aperture begins to open. It increases linearly the aperture in size with respect to time and provides the maximum aperture at a time $t_1$ and remains the maximum aperture from the time $t_1$ to a time $t_2$. The program shutter 10 subsequently closes quickly and completes the exposure at a time $t_3$. Simultaneously, as shown in FIG. 3, the electronic flash 17 is triggered at a lapse of time T1 from the commencement of opening of the program shutter 19 and provides a flash duration time T2 of illumination light toward the scene to be photographed. In the ever-flash exposure control, the time T1 before the flash triggering and the flash duration time T2 are controlled to vary the effective quantity of flash illumination light contributory to exposure. Specifically, in order to vary an exposure with flash illumination light, the electronic flash 17 is controlled to vary the flash duration time $t_2$ so as to vary the substantial quantity of flash illumination light. Further, the exposure with flash illumination light is varied by shifting the flash triggering timing T1 of the electronic flash 17 during a linear change in aperture between the times $t_0$ and $t_1$ without varying the flash duration time T2.

In such a flash control, the flash triggering time T1 is determined as a time period necessary for the program shutter 19 to develop an aperture corresponding to a subject distance detected by the automatic range finding system including the windows 14 and 16 from the commencement of shutter opening. In this instance, if the flash triggering time T1 from the commencement of opening of the program shutter 19 is shorter than a critical shortest period of time $\Delta t$ necessary for the shutter 19 to become stable in dynamic operation, the electronic flash 17 is triggered at a lapse of the critical shortest time $\Delta t$ substituted for the flash triggering time T1 and, simultaneously, controlled to shorten the flash duration time T2.

Figure 4:
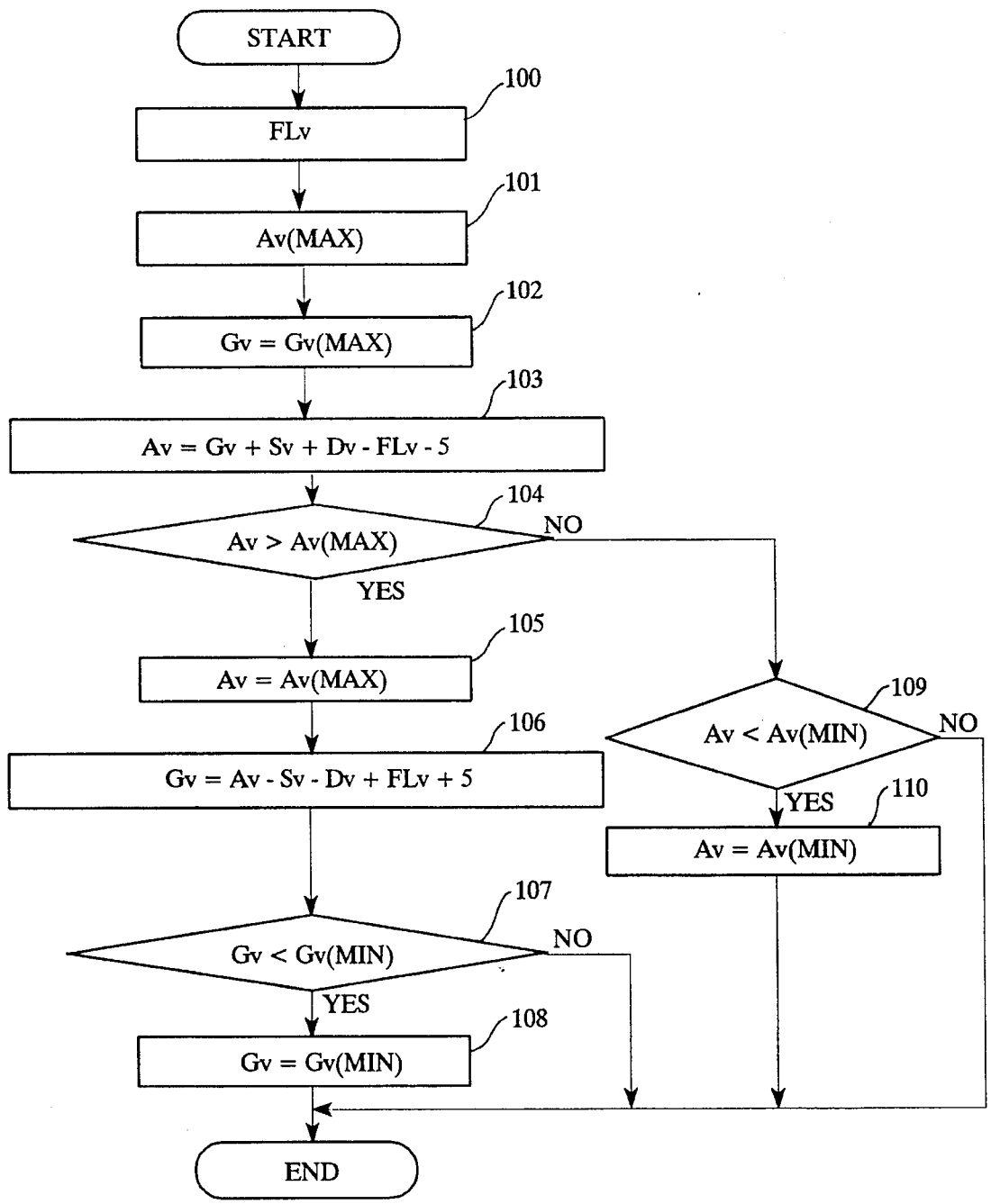
FIG. 4 is a flow chart illustrating an ever-flash exposure control sequence routine.

The operation of the ever-flash exposure control system depicted in FIG. 2 will be best understood by reviewing FIG. 4, which is a flow chart illustrating an ever-flash exposure control sequence routine for the microcomputer. Programming a computer is a skill well understood in the art. The following description is written to enable a programmer having ordinary skill in the art to prepare an appropriate program for the computer. The particular details of any such program would of course depend upon the architecture of the particular computers selected.

In the following sequence routine, various parameters indicated by references followed by a small character v are values expressed by what is called an additive system of photographic exposure (apex system).

Referring to FIG. 4, which is a flow chart illustrating an ever-flash exposure control sequence routine, when the built-in flash camera is powered on and the shutter release button 11 is depressed half, the routine commences and control passes to a function block at step 100 where a flash value FLv is determined as an apex value. The flash value FLv is given by the following equation (I):

$$FLv = \log_2 OFS \quad \text{(I)}$$

In this equation (I), OFS is the correction value found in a correction value table 21b stored in the ROM 21.

The correction value table 21b carries data of correction values defined by subject distance D and scene brightness B as parameters as shown in FIG. 6. In this instance, possible subject distances are divided into four ranges, namely a first distance range from a near distance (NEAR) to a first specific distance D1 of, for instance, 1.3 m, a second distance range from the first specific distance D1 to a second specific distance D2 of, for instance, 3 m, a third distance range from the second specific distance D2 to a third specific distance D3 of, for instance, 8.9 m, and a fourth distance range from the third specific distance D3 to infinity. Similarly, scene brightness are divided into four ranges, such as a first brightness range from 0 (zero) to first specific brightness B1 corresponding to a brightness value Bv of, for instance, 3.5, a second brightness range from the brightness B1 to second specific brightness B2 corresponding to a brightness value Bv of, for instance, 6, a third brightness range from the brightness B2 to third specific brightness B3 corresponding to a brightness value Bv of, for instance, 6, and the fourth brightness range from the brightness B3 to infinity. For instance, a correction value OFS of ¼ (which corresponds to −2 Ev) is selected for a subject which is in a scene with scene brightness in the second brightness range (B1–B2) at a subject distance in the first distance range (NEAR - D1). A correction value OFS of 1 (which corresponds to 0 Ev) is selected for a subject which is in the scene with brightness in the second brightness range (B1–B2) at a subject distance in the fourth distance range (B3–B4).

Subsequently, at step 101, a minimum aperture value Av(MIN) which is an apex value for the smallest aperture of the program shutter 19 is found by searching an aperture value table (not shown) stored in the ROM 21 carrying aperture value data defined by scene brightness B and film speed S as parameters. Further, a maximum guide number value Gv(MAX) is calculated as an apex value based on a guide number G of the electronic flash 17 from the following equation (II) at step 102:

$$Gv = 2\log_2 G \quad \text{(II)}$$

At step 103, an aperture value Av for the maximum guide number value Gv(MAX) is calculated from the following equation (III):

$$Av = Gv + Sv + Dv - FLv \quad \text{(III)}$$

In the above equation, Sv is an apex value of film speed. A film speed of 100 in ISO standard is expressed as a film speed value of 5. A subject distance value Dv used in the equation (III) is calculated from the following equation (IV):

$$Dv = -2\log_2 D \quad \text{(IV)}$$

Figure 7A:
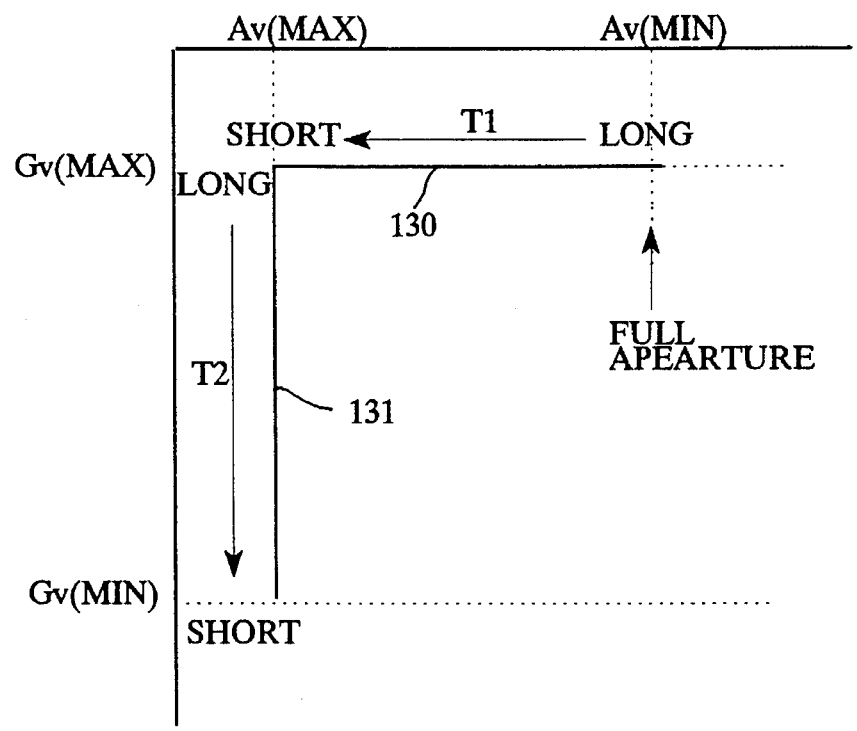
FIGS. 7A and 7B are diagrammatic illustrations showing flash exposure control according to ever-flash exposure control sequence routines shown in FIGS. 4 and 5, respectively.

As seen in FIG. 7A which shows the relationship between an exposure value Ev and a guide number value Gv, the aperture value Av is on a line segment 130 or on an extension of the line segment 130 beyond the maximum aperture value Av(MAX).

At step 104, a decision is made as to whether the aperture value Av is larger than the maximum aperture value Av(MAX) which is an apex value for the smallest aperture of the program shutter 19. If the answer to the decision is "YES," this indicates that the aperture value Av is on the extension of the line segment 130, then, the maximum aperture value Av(MAX) is substituted for the aperture value Av for the purpose of cramping the aperture value Av at the largest end of the line segment 130 at step 105. By means of clamping the aperture value Av at the maximum aperture value Av(MAX), the critical shortest time $\Delta t$ is taken as the flash triggering time T1.

After the determination of the flash triggering time T1, at step 106, a guide number value Gv is calculated from the following equation (V):

$$Gv = Av - Sv - Dv + FLv + 5 \quad \text{(V)}$$

The guide number value Gv thus obtained is on a line segment 131 or an extension of the line segment 131 beyond the minimum guide number value Gv(MIN). The guide number value Gv gives a reduced flash duration time T2.

Subsequently, at step 107, a decision is made as to whether the guide number value Gv is smaller than the minimum guide number value Gv(MIN). If the answer to the decision is "YES," the minimum guide number value Gv(MIN) is substituted for the guide number value Gv at step 108 for the purpose of clamping the guide number value Gv at the smallest end of the line segment 131. By means of clamping the guide number value Gv at the minimum guide number value Av(MAX), the electronic flash 17 provides illumination light for the possible shortest flash duration of time T2.

On the other hand, if the answer to the decision concerning the maximum aperture value made at step 104 is "NO," another decision is made at step 109 as to whether the aperture value Av is smaller than the minimum aperture value Av(MIN). If the answer to the decision is "YES," the minimum aperture value Av(MIN) is substituted for the aperture value Av at step 110 for the purpose of cramping the aperture value Av at the smallest end of the line segment 130. As a result, the flash triggering time T1 is advanced by a time $t_0$ from the time $t_1$. After substituting the minimum guide number value Gv(MIN) for the guide number value Gv at step 108 or the minimum aperture value Av(MIN) for the aperture value Av at step 110, the sequence routine is terminated.

Further, when the answer to the decision made at step 107 or at step 109 is "NO," that is, the aperture value Av and the guide number value Gv is not less than the minimum aperture value Av(MIN) and the minimum guide number value Gv(MIN), respectively, the sequence routine is terminated.

Figure 5:
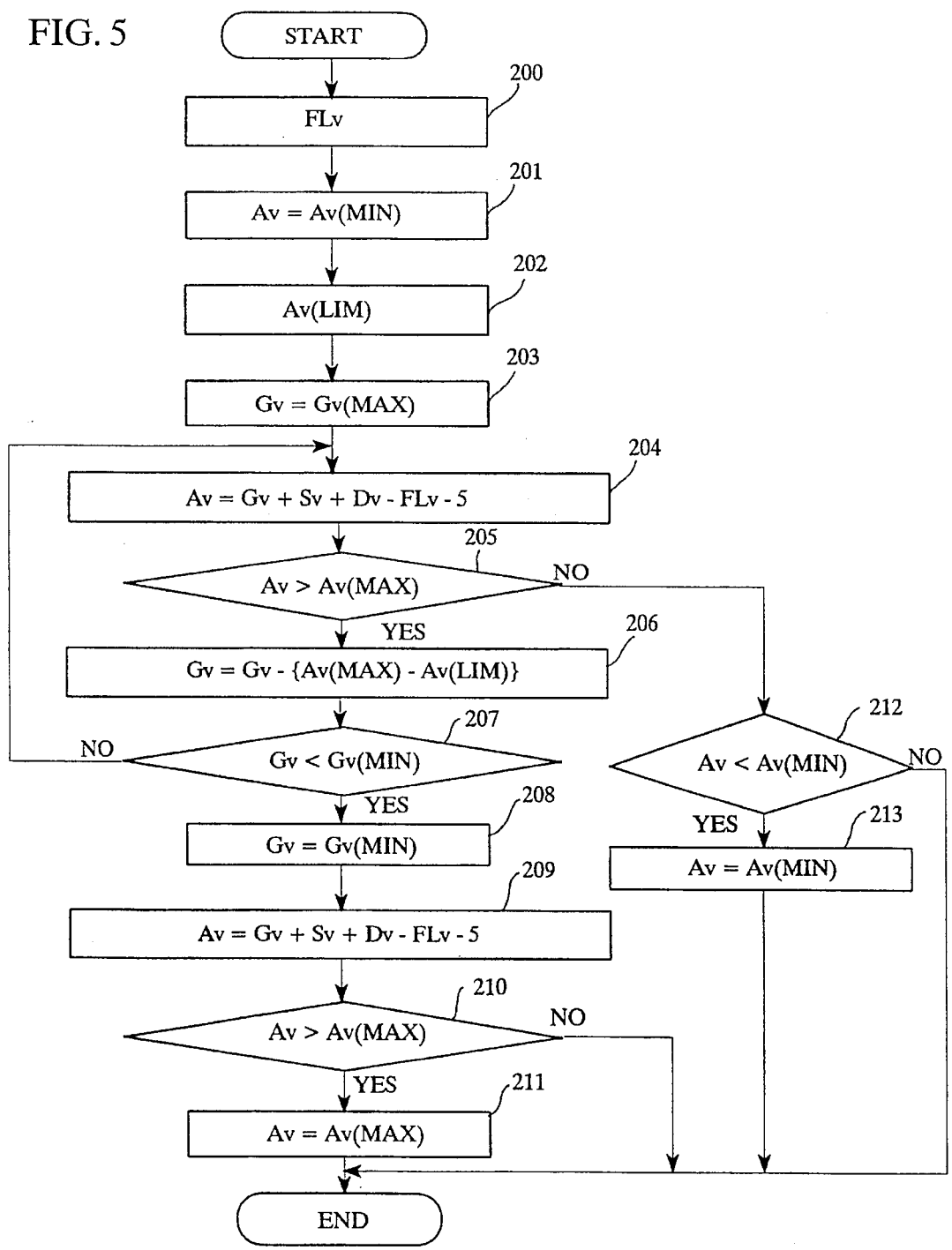
FIG. 5 is another flow chart illustrating an ever-flash exposure control sequence routine.

Referring to FIG. 5, which is a flow chart illustrating another eve-flash exposure control sequence routine, when the built-in flash camera is powered on and the shutter release button 11 is depressed half, the automatic range finding system and the photometric device 18 detect the subject distance D of a subject and the brightness B of a scene. Thereafter, the sequence routine commences and control passes to a function block at step 200 where an flash value FL is calculated from the equation (I) using an correction value OFS found in the correction value table in the same manner as previously described.

Figure 7B:
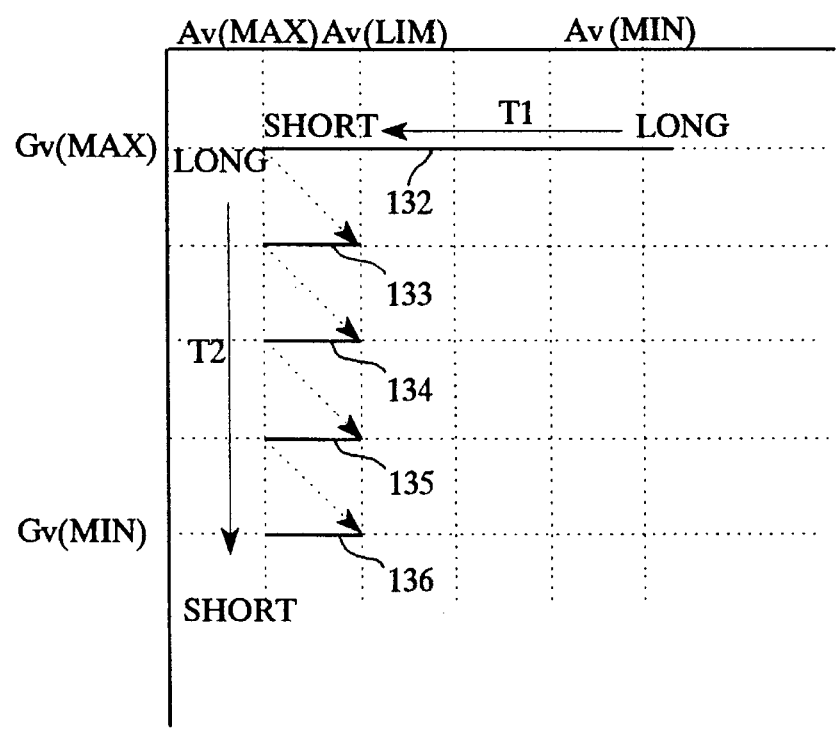
Figure 8:
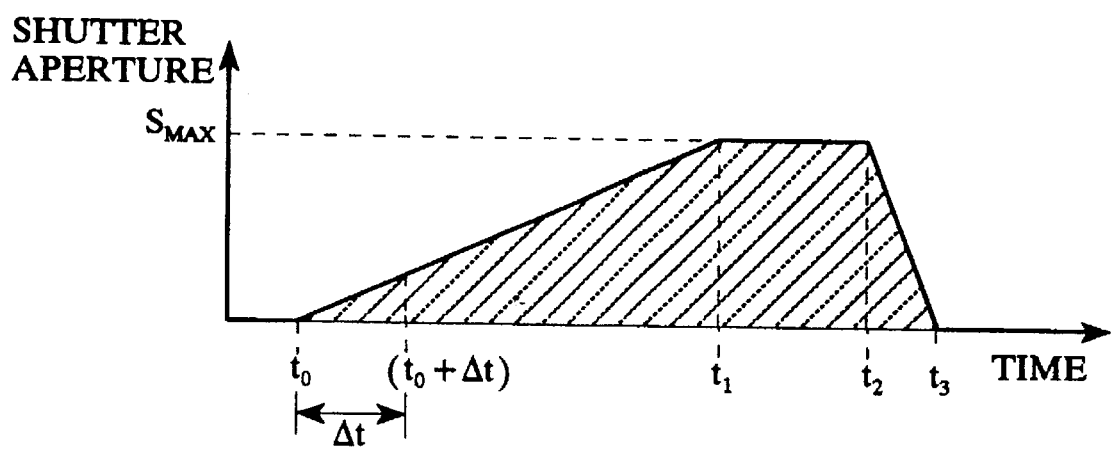
FIG. 8 is a diagram showing the shutter aperture characteristic.

Subsequently, at step 201, the minimum aperture value Av(MIN) is obtained according to the brightness value Bv and the film speed value Sv of a film used. Further, at step 202, a limiting aperture value Av(LIM) is determined so as to be slightly smaller than the maximum aperture value Av(MAX) for the critical shortest time At. This limiting aperture value Av(LIM) may be an invariable, or otherwise an variable according to the aperture value Av and, however, must be of a value which enables the program shutter 19 to perform highly reliable operation between the flash triggering time T1 at which the program shutter 19 provides the aperture value Av(LIM) and the critical shortest time At. Subsequently, the maximum guide number value Gv(MAX) for the longest flash duration of time is calculated from the equation (II), previously described, at step 203. After calculating a distance value Dv for the detected subject distance D from the equation (III), an aperture value Av for the maximum guide number value Gv(MAX) is calculated from the equation (IV), described previously, at step 204. As seen in FIG. 7B which shows the relationship between exposure value Ev and guide number value Gv, these aperture value Av and guide number value Gv thus obtained are on either a line segment 132 or an extension of the line segment 132 beyond the minimum end of the line segment 132.

At step 205, a decision is made as to whether the aperture value Av is larger than the maximum aperture value Av(MAX). If the answer to the decision is "YES," the guide number value Gv is corrected or changed by a decrement of a difference of the maximum aperture value Av(MAX) from the limit aperture value Av(LIM) by calculating the following equation (VI) at step 206.

$$Gv=Gv-\{Av(MAX)-Av(LIM)\} \qquad (VI)$$

This procedure is taken for the purpose of placing the guide number value Gv on the line segment 133 or on the extension of the line segment 133 when these aperture value Av and guide number value Gv are on the right side of the line segment 132 shown in FIG. 7B.

Subsequently, a decision is made at step 207 as to whether the corrected guide number value Gv is less than the guide number value Gv(MIN) for the possible shortest peak duration. If the answer to the decision is "NO," this indicates that the guide number value Gv is not less than the minimum guide number value Gv(MIN), another calculation is made at step 204 to obtain a corrected aperture value Av for the guide number value Gv corrected at step 206. In this instance, these corrected aperture value Av and guide number value Gv are placed on the line segment 133 or an extension of the line segment 133. By this means, the flash duration time T2 of the electronic flash 17 is shortened. Thereafter, steps 205 through 207 are repeated until the guide number value Gv becomes less than the maximum guide number value Gv(MAX). During the repetition of these steps 205 through 207, these corrected aperture value Av and guide number value Gv shift their positions from the line segment 133 to a line segment 136 step by step. Each line segment 133-136 defines combinations of aperture value Av and guide number value Gv with which the program shutter 19 performs highly reliable operation. Accordingly, as long as these aperture value Av and guide number value Gv are on any one of these line segments 133-136, by triggering the electronic flash 17 according to these apex values, the ever-flash exposure control is performed to regulate the flash duration of the electronic flash 17 with a high precision, providing precise flash exposure.

When the answer to the decision at step 207 becomes "YES," the minimum guide number value Gv(MIN) is substituted for the guide number value Gv for the purpose of retaining the guide number value Gv on the line segment 136 at step 208. As a result, the flash duration time T2 of the electronic flash 17 is changed to the possible shortest time.

At step 209, a calculation of the equation (IV) is made once again so as to obtain an aperture value Av for the minimum guide number value Gv(MIN). These aperture value Av and guide number value Gv are also on the line segment 136 or the extension of the line segment 136. Subsequently, a decision is made at step 210 as to whether the aperture value Av is greater than the maximum aperture value Av(MAX). If the answer to the decision is "YES," the maximum aperture value Av(MAX)is substituted for the aperture value Av at step 211 for the purpose of cramping the aperture value at the largest side end of the line segment 136. As a result, the critical shortest time At is taken as the flash triggering time T1 (see FIG. 3).

On the other hand, if the answer to the decision concerning the maximum aperture value Av(MAX) made at step 205 is "NO," another decision is made at step 212 as to whether the aperture value Av is less than the minimum aperture value Av(MIN). If the answer to the decision is "YES," the minimum aperture value Av (MIN) is substituted for the aperture value Av at step 213 for the purpose of cramping the aperture value Av at the smallest end of the line segment 132. As a result, the flash triggering time T1 is advanced by the time $t_0$ from the time $t_1$.

If the answer to any one of the decisions made at step 210 and 212 is "NO," or after the execution of substitution of the maximum aperture value Av(MAX) for the aperture value Av at step 211 or the execution of substitution of the minimum aperture value Av(MIN) for the aperture value Av at step 213, the sequence routine is terminated.

With the ever-flash exposure control according to any one of the preferred sequence routines shown in FIGS. 4 and 5, the aperture value Av and the guide number value Gv are determined precisely for proper exposure. Because these aperture value Av and the guide number value Gv define the flash triggering time T1 and the flash duration time T2, respectively, the electronic flash 17 is timely triggered and provide an optimized quantity of illumination light necessary to make proper exposure.

While, in the above-described embodiments, the ever-flash exposure control is executed by use of the control program 21a loaded in the CPU 20, nevertheless, it may be performed by a hard wear circuit.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A built-in flash camera equipped with an ever-flash exposure control system including operation means for calculating a triggering time from the commencement of gradual opening of a program shutter at which an electronic flash is triggered and a flash duration time for which the electronic flash continuously provides illumination light so as to make proper exposure and flash control means for triggering the electronic flash at the triggering time for the flash duration time, said operation means comprising:

first operation means for calculating an aperture size of said program shutter according to a given subject distance necessary to make proper exposure with illumination light of a possibly longest flash duration time and calculating a triggering time necessary for said program shutter to develop said aperture; and second operation means for comparing said triggering time calculated by said first operation means with a predetermined shortest time, substituting said predetermined shortest time for said triggering time T1 when said triggering time T1 is shorter than said predetermined shortest time, and calculating a flash duration time according to said given subject distance suitable for proper exposure with flash illumination light when said electronic flash is triggered at said predetermined shortest time.

2. A built-in flash camera as defined in claim 1, wherein said predetermined shortest time is of a time from the commencement of opening of said program shutter necessary for said program shutter to become stable in dynamic operation.

3. A built-in flash camera as defined in claim 1, wherein said program shutter is a lens shutter comprising a plurality of sector blades and functions as a diaphragm.

4. A built-in flash camera equipped with an ever-flash exposure control system including operation means for calculating a triggering time from the commencement of gradual opening of a program shutter at which an electronic flash is triggered and a flash duration time for which the electronic flash continuously provides illumination light so as to make proper exposure and flash control means for triggering the electronic flash at the triggering time for the flash duration time, said operation means comprising:

first operation means for calculating an aperture size of said program shutter according to a given subject distance necessary to make proper exposure with illumination light of a possibly longest flash duration time and calculating a triggering time necessary for said program shutter to develop said aperture; and second operation means for comparing said triggering time calculated by said first operation means with a predetermined shortest time, reducing a flash duration time from said longest flash duration time by a predetermined time when said triggering time is shorter than said predetermined shortest time, calculating an aperture size of said program shutter according to the given subject distance suitable for proper exposure with illumination light of said reduced flash duration time, and causing said first operation means to perform said calculation of the triggering time necessary to develop said aperture by repeatedly increasing said triggering time by a predetermined time until the triggering time becomes longer than said predetermined shortest time.

5. A built-in flash camera as defined in claim 4, wherein said predetermined time is of a time from the commencement of opening of said program shutter necessary for said program shutter to become stable in dynamic operation.

6. A built-in flash camera as defined in claim 4, wherein said program shutter is a lens shutter comprising a plurality of sector blades and functions as a diaphragm.

* * * * *